United States Patent [19]

Stein et al.

[11] Patent Number: 5,035,173
[45] Date of Patent: Jul. 30, 1991

[54] AUTOMATIC POPCORN POPPING APPARATUS

[75] Inventors: Andrew M. Stein, Massapequa Park; John A. DeSantis, Medford, both of N.Y.

[73] Assignee: Six Corners Development Company, Amityville, N.Y.

[21] Appl. No.: 365,406

[22] Filed: Jun. 13, 1989

[51] Int. Cl.[5] ............................................. A23L 1/18
[52] U.S. Cl. .................................... 99/323.7; 99/323.9
[58] Field of Search ................. 99/323.4, 323.5, 323.6, 99/323.7, 323.8, 323.9, 323.11

[56] References Cited

U.S. PATENT DOCUMENTS

| | | | |
|---|---|---|---|
| 1,218,341 | 3/1917 | Truitt . | |
| 1,704,133 | 3/1929 | Le Claire . | |
| 1,977,831 | 10/1934 | Marshall et al. | 221/47.1 |
| 2,017,293 | 10/1935 | Priest | 53/4 |
| 2,034,484 | 3/1936 | Pagendarm | 194/48 |
| 2,230,460 | 2/1941 | Kleinwachter | 312/121 |
| 2,458,190 | 1/1949 | Newburger | 219/19 |
| 2,529,877 | 11/1950 | Ladge | 34/88 |
| 2,575,643 | 11/1951 | Tamsen | 34/225 |
| 2,646,189 | 7/1953 | Wickesberg | 222/36 |
| 2,859,015 | 11/1958 | Spangler | 257/2 |
| 2,939,379 | 6/1960 | Schmitt | 99/238.4 |
| 3,197,076 | 7/1965 | Chamblee | 222/146 |
| 3,253,532 | 5/1966 | Jones | 99/238.3 |
| 3,321,107 | 5/1967 | Goven et al. | 222/2 |
| 3,645,422 | 2/1972 | Cretors | 222/169 |
| 3,783,820 | 1/1974 | Hautly | 118/19 |
| 4,094,446 | 6/1978 | Brutsman | 222/146 HE |
| 4,171,066 | 10/1979 | Hirose | 221/150 A |
| 4,171,667 | 10/1979 | Miller et al. | 99/323.6 |
| 4,372,354 | 2/1983 | Moore | 141/361 |
| 4,426,923 | 1/1984 | Ohata | 99/468 |
| 4,477,003 | 10/1984 | Baker et al. | 222/642 |
| 4,632,275 | 12/1986 | Parks | 222/25 |
| 4,727,798 | 3/1988 | Nakamura | 99/323.5 |
| 4,850,120 | 7/1989 | Stein | 99/474 |

Primary Examiner—Robert W. Jenkins
Attorney, Agent, or Firm—Pennie & Edmonds

[57] ABSTRACT

An apparatus for the automatic, continuous popping of popcorn having an upper storage compartment, heating coils for providing heat inside the upper storage compartment, a popcorn popping kettle, a lower storage compartment housing electrical components, a corn supply, a salt supply and an oil supply. The apparatus preferably includes a vacuum source for directing a predetermined amount of corn and salt from their supplies into the popping kettle, and a submersible pump for delivering a predetermined amount of oil into the popping kettle.

36 Claims, 4 Drawing Sheets

AUTOMATIC POPCORN POPPING APPARATUS

TECHNICAL FIELD

The present invention relates to an apparatus for popping and storing popcorn and more specifically to a fully automated apparatus for the continuous popping of popcorn.

PRIOR ART

Various devices have been developed which automatically pop and package premeasured amounts of popcorn. machines which are activated by the insertion of coins. Once in operation, these devices sequence through a series of operations to produce a package of popcorn. When a cycle is complete, the device then returns to an inactive state.

U.S. Pat. No. 2,017,293 illustrates one such coin operated popcorn vending machine. When a customer desires popcorn, coins are inserted into an appropriate slot, thereby activating a device for measuring corn. The measured corn is fed through a chute and into a skillet where it is popped. Thereafter, the corn is placed onto a conveyer which transports the corn to a storage chamber while butter is applied to the moving corn. The popcorn is propelled from the storage chamber into a chute having a salt shaker and finally to the customer in the form of an individual serving. After delivery, the cycle is complete and the device ceases operation.

A similar device is described in U.S. Pat. No. 2,939,379. This apparatus for popping popcorn is also initiated by the deposit of coins whereby the device completes a full cycle to deliver an individual serving prior to automatically terminating operation.

These prior art devices suffer from a number of disadvantages. The primary disadvantage involving the use of bulky mechanical moving parts such as conveyors, pistons, cams, gears and the like, all of which are subject to maintenance and mechanical failure. Furthermore, these devices act in a series of sequential steps requiring precise timing and coordination of the moving parts. Furthermore, this method of producing popcorn is inefficient in that several operations which can be performed simultaneously, such as the addition of shortening and salt, are instead performed sequentially. In addition, these devices produce only limited supplies (i.e., single servings) of popcorn in response to an initiating action.

Other devices have been developed which operate continuously to produce popcorn. These devices, however, require manual operation in that the supply of raw corn to the popcorn popper requires hand loading of the corn. One example of these includes household popcorn makers of the conventional oil, hot air or electric types. Larger devices of a similar nature are often found in entertainment arenas, such as movie theaters and sport stadiums, and include a large or adjustable capacity popping mechanism in combination with a bin to retain the popped coin. An example of these large scale poppers is "The Regency" available from Stein Industries, Inc. of Amityville, N.Y. While these devices offer numerous advantages over the current state of the art devices, it requires manual loading and unloading.

Since such popcorn making devices are generally used at entertainment arenas where intermission or other pauses between events often results in large crowds forming at the food counters, it is desirable to have an apparatus capable of continuously and automatically producing popped corn. Such an apparatus reduces the duties of the food counter attendant so that he or she can work more efficiently to better serve the needs of the customers. Therefore, when large crowds gather, the attendant does not need to be concerned with the manual feeding of raw corn into the popcorn popper or the manual unloading of the popped corn therefrom and can instead turn their full attention to the needs of the customers.

Further, since the present invention greatly reduces the number of precisely timed sequencing steps and the need for intricate moving parts, the apparatus is less susceptible to breakdown and malfunction The configuration of the current invention also presents a more energy efficient apparatus for producing popped corn.

Accordingly, the present invention provides a simple solution to the problems encountered in using the prior art devices in a heretofore unknown manner, so as to improve the efficiency of automatically and continuously producing popcorn.

SUMMARY OF THE INVENTION

The invention relates to an automated corn popping apparatus having a kettle for popping corn therein, means for delivering oil to the kettle, means for heating the oil in the kettle, means for delivering uniform predetermined amounts of corn and salt to the kettle, means for emptying the contents of the kettle at predetermined intervals, and means for automatically energizing each of the preceding components according to a predetermined sequence so that the kettle is heated prior to the introduction of oil, corn and salt therein, and is emptied after substantially all of the corn has popped.

The corn delivery means includes a vacuum chamber located above the kettle for periodically removing the predetermined amount of corn from a supply prior to delivering the amount to the kettle. This chamber preferably comprises a container having a feed line connected to the corn supply and sloped bottom walls extending to an outlet. A vacuum line connects to the container with a vacuum generating source such as a vacuum motor. The outlet includes a hinged closure member located on a bottom portion of the container, with the closure member being retained in a closed position when the container is under vacuum, but is movable to an open position by the weight of the corn in the chamber when the vacuum is terminated.

The salt delivery means includes a hopper for retaining a supply of salt therein, and a valve connected to the vacuum line. This valve means normally is maintained in a closed position, but is capable of opening when vacuum is present in the vacuum line to deliver a predetermined amount of salt to the kettle. Generally, the amount of salt to be delivered to the kettle proportionally corresponds to the amount of corn to be delivered, and the kettle advantageously includes a stirrer for mixing the oil, corn and salt.

The oil delivery means includes an oil supply tank, means for heating the oil to a predetermined temperature, means for maintaining the predetermined temperature of the oil, and pumping means for delivery of the heated oil to the kettle. The pumping means may include a submersible pump located adjacent the bottom of the oil supply tank and conduit means extending from the pump to the kettle. Also, the oil temperature maintaining means includes a 24 volt heating element which may be continuously operated so that the oil is always at the proper temperature for delivery to the kettle.

The energizing means of the apparatus includes a timer, and the kettle has a thermostat operatively associated with the timer so that the timer is not operated until the thermostat senses that the kettle has achieved an appropriate corn popping temperature. Also, the emptying means includes a motor connected to the kettle by at least one elongated arm member. Operation of the motor causes the kettle to pivot from an upright position to an inclined position where the contents are emptied prior to returning the kettle to the upright position.

Another embodiment of the present invention includes a first storage compartment for holding an amount of popped corn, means for heating the first storage compartment to a predetermined temperature for warming the popped corn, popcorn popping means, a second storage compartment for supporting the first compartment and housing electrical components, a corn supply, a salt supply, a popping oil supply, means for automatically directing a predetermined amount of corn, salt and oil to the popping means, and means for automatically dispensing popped corn from the popping means to the first storage compartment.

The first storage compartment is designed to hold large amounts of popped corn and has at least one opening to allow access to the interior of the compartment. Preferably the apparatus is equipped with a heating element for supplying heated air into the first storage compartment to keep the popcorn warm and fresh. The heating element may be located either inside the first storage compartment, inside the second storage compartment, outside the apparatus or in any combination of the aforementioned, and may include an air circulating means.

The popcorn popping means may be any popper which is capable of receiving raw corn from a supply, heating the corn to popping temperature and dispensing the popped corn into the first storage compartment. Among available poppers are those incorporating hot air, high frequency radiant energy, microwave energy or electrical heating coils. Preferably, the popping means includes a mixing element and is configured to receive and heat a predetermined amount of oil, salt and corn therein.

The second storage compartment is located contiguous to the first storage compartment in either a side by side relationship such that there is at least one common wall therebetween. The second storage compartment supports the first storage compartment and houses the necessary electrical components for the apparatus. Preferably, this storage compartment also houses the corn, salt and oil supplies, and may also be equipped with means to heat the oil.

Means for directing predetermined amounts of corn, salt and oil to the popping means are preferably conduits extending from the respective supplies to the popping means. These conduits may be of any suitable size, shape and material and are preferably equipped with a dispensing means adjacent to the popping means. Advantageously, these conduits are further provided with means to apply vacuum or pressure to the respective supplies to propel the corn, salt and oil through the conduits, to the dispensing means and ultimately into the popping means.

The popping means has a receptacle which is pivotably mounted and connected to a motor by at least one elongated arm member. Thus, operation of the motor causes the receptacle to pivot thus dispensing all popped corn therein into the first storage compartment before returning the receptacle to is original position to receive further amounts of corn for popping. The dispensing may initially occur as a result of the increased volume of the popped corn within the popping means which forces popped kernels to spill over the edge. In this embodiment, the popping means is preferably directly aligned with the first storage compartment or located within the compartment itself. Alternatively, the popping means may be rotatably mounted adjacent to or within the first storage compartment. Therefore, when the corn has fully popped, the receptacle rotates from a horizontal plane to an inclined plane such that the popped corn falls from the popping means into the first storage compartment.

In another embodiment, the apparatus of the present invention is used in combination with a warming apparatus such as that disclosed in U.S. Pat. No. 4,850,120 In this embodiment, the first storage compartment is further equipped with a chute connecting it to the bulk food storage of the accompanying apparatus. When connected as such, popcorn held in the first compartment can be directed through the chute into the adjacent popcorn warming apparatus for storage, display and warming until the attendant has the opportunity to place the popcorn into individual containers and subsequently into the shelves of the warming apparatus. This configuration allows the apparatus to continuously produce popcorn without stopping to fill individualized containers with popped corn from the first storage compartment.

BRIEF DESCRIPTION OF THE DRAWINGS

Preferred embodiments of the invention are described hereinbelow with reference to the drawing figures, wherein.

DETAILED DESCRIPTION OF THE PREFERRED EMBODIMENTS

Figure 1:
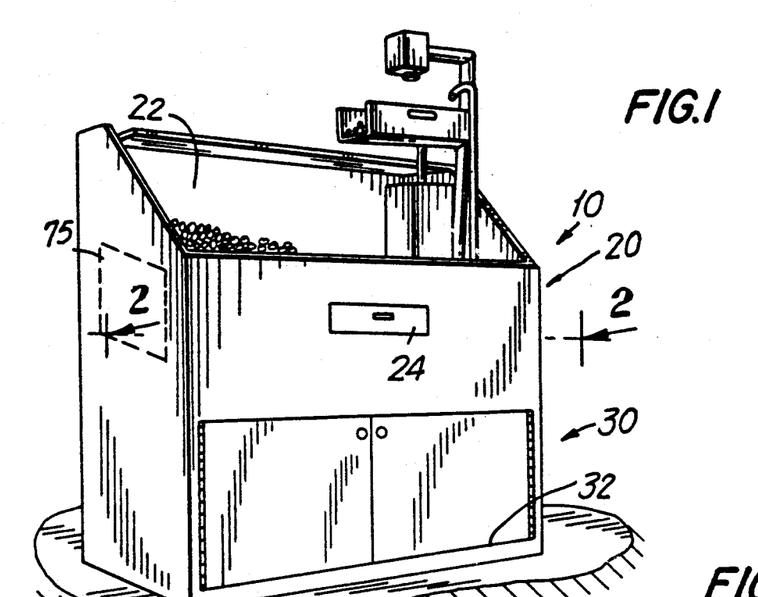
FIG. 1 is a perspective view of an automatic popcorn popping apparatus according to the invention.
Figure 2:
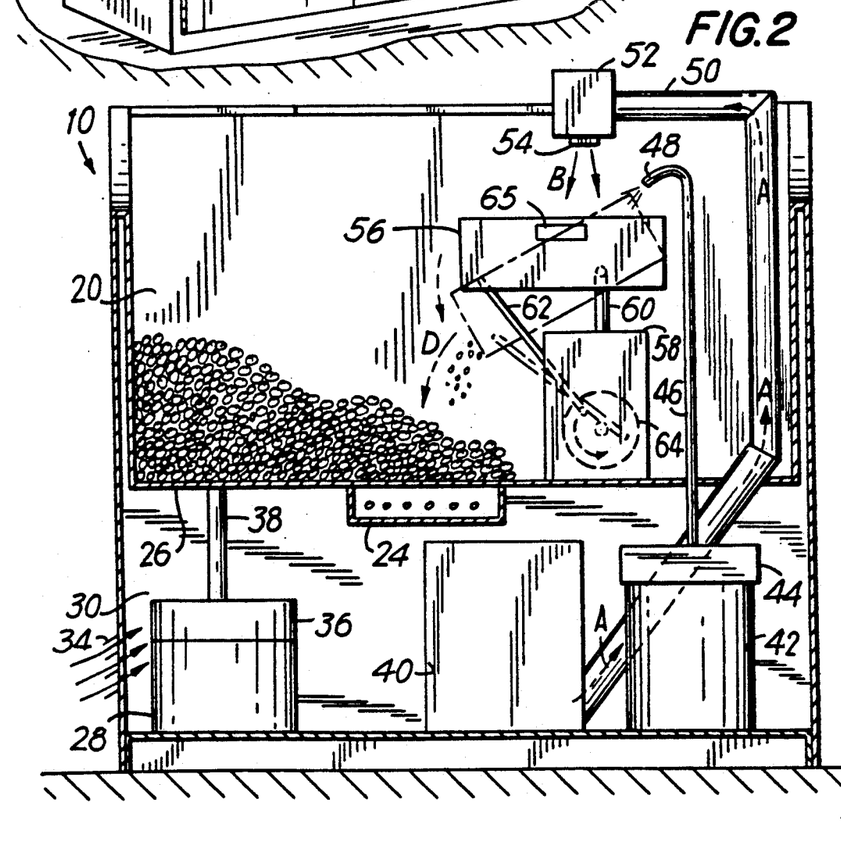
FIG. 2 is a cross-section view of the apparatus of FIG. 1 taken along line 2—2.

Referring now to FIGS. 1 and 2, there is illustrated industry and primarily for use in movie theaters and the like. This apparatus combines a first storage compartment 20 and a second storage compartment 30 into a single unit. First storage compartment 20 has at least one opening 22 to allow access into its interior. Alternatively, opening 22 may be equipped with at least one door (not shown) to reduce the amount of heat lost therefrom.

First storage compartment 20 serves to hold an amount of popped corn at a predetermined temperature above room temperature. Compartment 20 may be warmed by introducing heated air from a pipe 38, the end of which includes a diffuser or other air distributing means. For example, a pipe or tube running the length of compartment 20 and having a plurality of holes can be used to introduce the warm air into first storage compartment 20. The air is warmed by an inline heater 36 located downstream of the diffuser, the heater including a plurality of wires or heating coils through which electrical current passes, thus causing the wires to heat and warm the air in a manner well known to those skilled in the art. Air is forced through heater 36 and pipe 38 by blower 28. Blower 28 and heater 36 are conveniently located in includes vent 34 for cooling of the electrical components.

For convenience in tailoring the operation of the unit to the demands of food service, heater 36 may be of the type that can provide different levels of heat, such levels being selectable by a control means located on the exterior of the apparatus. Thus, when initially turning on the unit, a higher heat level can be used to quickly warm first storage compartment 20. After the desired temperature is reached, the heating level can be automatically or manually reduced to a lower value.

This heating control can also be utilized with a thermostat for intermittently operating blower 28. This enables energy conservation in that blower 28 does not have to be continuously operated. The heating control can be designed to automatically achieve the higher heating level when the blower is operating so as to further reduce the operating time of blower 28.

An upper portion of second storage compartment 30 forms a lower portion of first storage compartment 20. As shown in the FIG. 2, a common wall 26 is provided between these sections. In order to allow heated air in compartment 30 to be introduced into compartment 20, a plurality of vents in the form of holes are provided in wall 26. Preferably, this wall may be a perforated metal plate or screen. Warm air thus enters compartment 20 for keeping the popped corn warm. In addition, it is advantageous to configure the perforations of the common wall 26 of a size which is larger than that of unpopped corn but smaller than the popped corn so that unpopped kernels can be removed from the popped product to reduce the amount of such kernels which are to be dispensed to customers. Generally, a portion of wall 26 is designed to have such perforations, and a drawer 24 is positioned below the portion of the wall to receive the unpopped kernels for disposal thereof.

The electrical components and other necessary components needed for proper operation of apparatus 10 can be found in second storage compartment 30, access to which is gained by doors 32. Second storage compartment 30 also serves as a base for apparatus 10, in addition to housing supplies of raw corn and salt 40, and corn popping oil 42. Preferably, corn supply 40 is a large bin or container having adjacent compartments for separately holding corn and salt. Bin 40 may be dimensioned and configured to any size which conforms to the open size and shape of second storage compartment 30. In the preferred embodiment, however, bin 40 is designed to hold one bag, i.e., about 50 pounds, of corn and a proportionally suitable supply of salt therefor. If desired for large capacity popping, the bin could be sized to hold even greater amounts of corn. Bin 40 is sealable to prevent dust particles, dirt, oil and other undesirable elements from tainting the corn and salt supply therein.

Similarly, oil tank 42 is a sealable container capable of holding a supply of popping oil. Also, although not shown in the drawings, greater storage capacity can be achieved by connecting two or more of these containers in series. If preheated oil is desired, then oil tank 42 may additionally be equipped with heating means. Heating means may include heating the exterior of tank 42 by any conventional manner, such as flame, heating coils or microwaves. Examples of appropriate heating means are disclosed in U.S. Pat. No. 4,828,146.

Tank 42 is sealable to allow development of a pressure head within the container to facilitate dispensing of the oil. Pressure, such as air pressure, is preferably developed within tank 42 by means of pump 44 positioned atop tank 42. Pump 44 may be any mechanical, pneumatic, hydraulic or electrical pump.

If desired, a second container similar to tank 42 can be used to introduce a flavoring or seasoning component onto the corn. Such components can include butter, margarine, cheese, sugar syrup or the like. If necessary this container can also be heated to retain the component in a liquid state. The tanks disclosed in U.S. Pat. 4,828,146 for holding a supply of liquid butter are preferable for use in this aspect of the invention.

Conduit 50 may be a single pipe which splits into two segments before attaching to the supplies in the lowermost portion of bin 40. One segment is operatively associated with the salt compartment of bin 40 while the other is similarly associated with the corn compartment. Conduit 50 extends upward from second storage compartment 30 to first storage compartment 20 and terminates above popping means 56, in direct alignment therewith. At the uppermost end, conduit 50 has a vacuum source 52 for extracting a predetermined amount of corn and salt from bin 40 through conduit 50, and into dispensing means 54 which initially retains and then introduces the corn and salt into popping means 56. Dispensing means 54 preferably comprises a spring release which is operatively associated with the vacuum source 52, so that a precise amount of raw corn and salt according to the capacity of the popping means 56 can be dropped therein.

In a preferred embodiment, vacuum source 52 is operatively associated with a suitable cammed timing device designed to activate the vacuum source for a predetermined period of time until the desired amount of corn and salt have been collected therein. After the amounts of corn and salt have been collected, vacuum source 52 automatically deactivates and activates spring release 54 thereby delivering corn and salt into popping means 56.

Container 42 is similarly equipped with a conduit 46 which is attached to an aperture in pump 44 by any conventional means. Conduit 46, which extends from container 42 to popping means 56, is preferably made of a metal such as stainless steel or aluminum, a plastic, or an elastomer. Other suitable materials, such as teflon or composites for contact with the oil to be dispensed can also be used. A preferred construction for conduit 46 is an aluminum tube.

Dispensing means 48 is located at the uppermost end of conduit 46 in close proximity to popping means 56. The pump includes a timing device so that the appropriate amount of oil is metered and introduced into the popping means prior to the introduction of the corn and salt. The amount of oil to be dispensed may also be controlled by suitable electronic circuitry which coordinates with the dispensing means of the apparatus to deliver a predetermined amount of oil into the popping means 56 in a timely fashion. Optimum operation is achieved when the oil is dispensed after the popping means has achieved the appropriate temperature for popping corn.

Popping means 56 includes a stainless steel receptacle having an open top to receive the corn, salt and oil from their dispensing means 54 and 48 respectively, an open front to dispense freshly popped corn into first storage compartment 20 two parallel side walls, a rear wall, a substantially horizontal bottom wall and means to heat the raw corn to popping temperature. This receptacle can be round, square, or any other suitable configuration, and would include a stirring bar therein for mixing the corn, salt and oil together. The heating means preferably includes heating coils located beneath the bottom wall of popping means 56 which operate continuously while apparatus 10 is activated and is operatively associated with thermostat 65 to regulate the temperature of popping means 56. Standard size popping kettles are available from C. Cretors & Co., Chicago, Ill. as model nos. G32E (32 oz. corn capacity), G20E, (20 oz.), and by Gold Medal, Cincinnati, Ohio, as the Coronado 28 oz. and 36 oz. These standard units, which are manually filled and emptied, can be converted to the automatic discharge apparatus of the invention by the addition of the motor and arm member arrangement disclosed FIGS. 1 and 5.

To facilitate the delivery of the freshly popped corn to first storage compartment 20, popping means 56 is pivotably mounted within compartment 20 by housing 58. Housing 58 has a first support member 60 which is pivotally attached to the rear of popping means 56, and second support member 62 pivotally attached to the front of popping means 56. At its lowermost end, second support member 62 is also pivotally attached to rotatable wheel 64. Wheel 64 is driven by an electric gear motor which is operated in conjunction with the timer controlling the various functions of apparatus 10. The timer is set to activate the motor when the raw corn delivered to popping means 56 has been substantially popped. This can be estimated at about 4½ minutes after being held at the appropriate popping temperature when activated, the motor first causes wheel 64 to rotate in the counterclockwise direction thereby tilting popping means 56 to an inclined position allowing the freshly popped corn to spill into first storage means 20. Thereafter, the motor powers wheel 64 in the clockwise direction to restore the popping means 56 to its original position.

Apparatus 10 may also be equipped with a display panel showing the setting of the various dispensing, timing and heating means. The display may also have warning lights to indicate when the supply of corn, salt or oil is running low. In addition, the entire operation can be controlled by a microprocessor or computer so that the timing of the sequence of the operation is properly conducted without external input from or monitoring by a counter attendant.

Apparatus 10 is set into continuous operation by activation of any suitable button, knob, pedal or switch. Since apparatus 10 automatically delivers and pops the corn, once the operator in charge of apparatus 10 has activated the switch, he or she is free to tend to any other chores without further attending to the apparatus.

Actuation of the switch the unit causes the following operations to occur in sequence. First, the receptacle is heated and a thermostat monitors the temperature of the receptacle until the appropriate popping temperature is achieved. Next, popping oil is directed to the popping means 56 from container 42 by pump 44, which propels the oil through conduit 46 to dispensing means 48. Next, a vacuum source 52 is activated to automatically extract predetermined amounts of salt and corn from the respective compartments of bin 40. The raw corn and salt travel through conduit 50 in the direction of arrow A until reaching dispensing means 54. After extracting the supply of raw corn and salt, vacuum source 52 is deactivated thereby triggering dispensing means 54 which dumps the corn and the salt into popping means 56.

Once the supply of raw corn is delivered to popping means 56 it is heated in the oil to popping temperature by heating means which are located in the bottom wall thereof. While the corn is heating, a predetermined amount of seasoning or flavoring may be added, if desired.

After the corn has substantially popped, the motor in housing 58 is activated forcing wheel 64 to rotate in the counterclockwise direction. This motion of wheel 64 in turn forces popping means 56 to rotate from its horizontal orientation into an inclined plane. The angle attained by popping means 56 is sufficient to cause the freshly popped corn to spill therefrom into first storage compartment 20 for storage and warming until the corn is delivered to the customer. Subsequently, the motor reverses direction forcing wheel 64 to rotate in the clockwise direction thereby restoring popping means 56 to its original orientation. This sequence of steps is repeated continuously until apparatus 10 is shut-off.

Apparatus 10 may further include a warming cabinet located adjacent the first storage compartment 20, and having a plurality of shelves. A typical unit is disclosed in U.S. Pat. No. 4,850,120. This embodiment allows an operator to fill empty containers with the freshly popped popcorn and thereafter place the filled containers into the upper storage compartment which maintains the popcorn at the desired temperature. Thus, a number of containers can be filled in this manner, heated and be ready for dispensing to a customer. Also, as one operator dispenses filled containers, another operator can replenish the supply by filling empty containers with the fresh popped corn, so that a large number of customers can be rapidly and efficiently served. The containers themselves can be stored in the warming apparatus so that less heat is lost from the warm popped corn when it is placed into the container.

Filled containers of popcorn are preferably maintained on shelves. Heated air is allowed to circulate throughout upper section by providing space between the end of the shelves and the walls. Alternately, shelves of a perforated material, such as wire shelving, or shelves having vents to allow air circulation therethrough can also be used.

Also shown in FIG. 1 is optional chute 75 which may be used when apparatus 10 is used with the peripheral warming device for additional storage capacity. Chute 75 is hingeably mounted so that chute 75 can swing open to deliver the fresh popcorn into the peripheral warming device. Alternately, this chute 75 may include a plate which is slidable between closed and open positions.

Figures 3, 4:
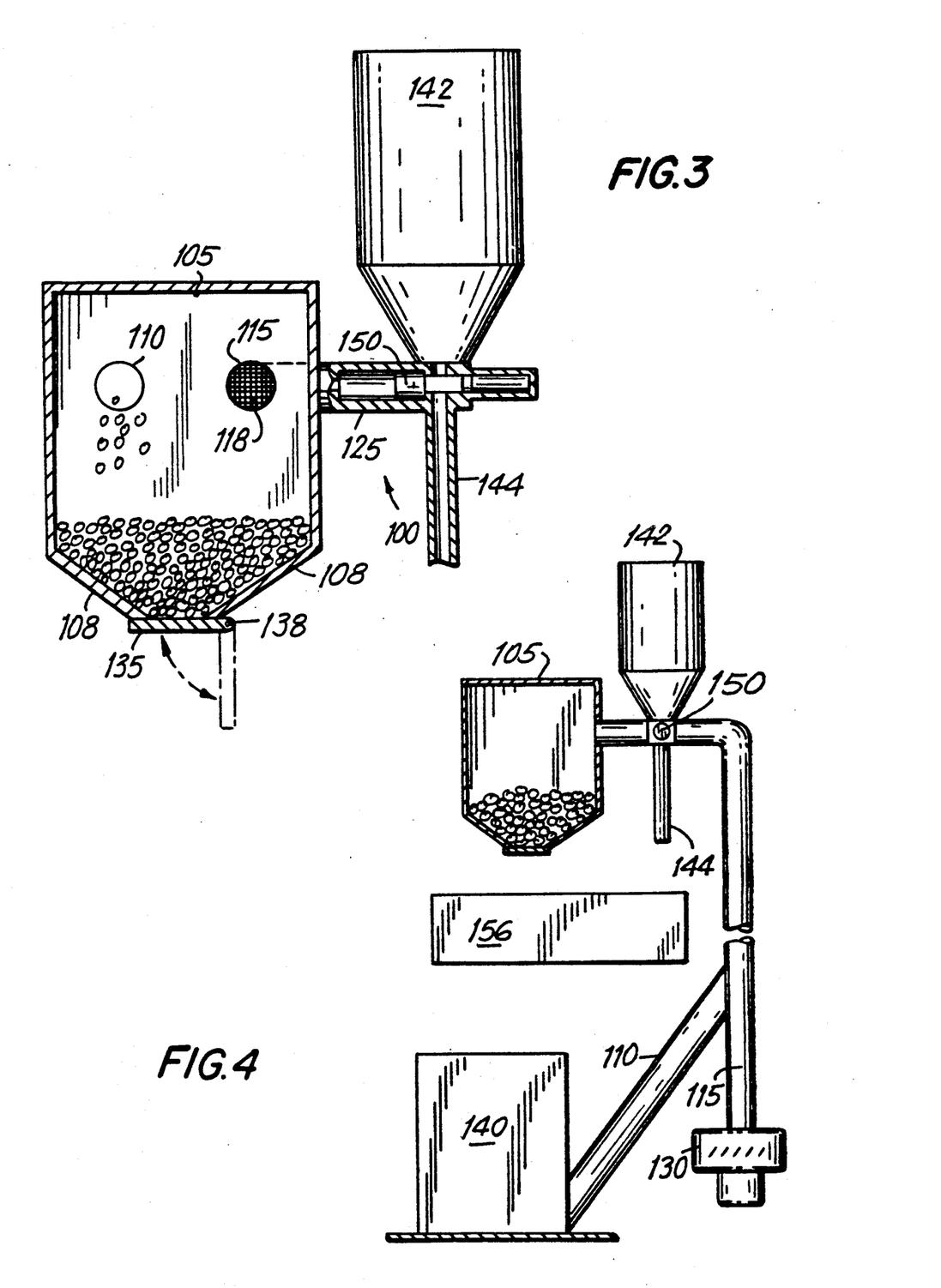
FIG. 3 is a front view of an alternate embodiment of a corn and salt dispensing apparatus according to the present invention.
FIG. 4 is a side view of the apparatus of FIG. 3.

Referring now to FIGS. 3 and 4, there is illustrated a preferred corn and salt dispensing head 100 for the automated popping apparatus of the invention. This head includes a chamber 105 having two lines 110, 115 mounted on a rear wall thereof. The first line 110 is connected to a supply of corn 140 while the second line is connected to a vacuum motor 130 or other vacuum source. Line 115 includes screen 118 to prevent corn from being sucked into the vacuum motor 130. Mounted on the second line 115 is a lateral extension 125, a salt supply container 142, and a salt dispensing valve 150. When 1¼ inch diameter PVC piping is used as these lines, a suitable vacuum is achieved through use of a vacuum motor model 116325 available from the Lam Electric Division of Ametek, Kent, Ohio. According to a predetermined sequence which will be explained in more detail below, when the motor 130 is energized, a vacuum is established in line 110, chamber 105, line 115 and line 125. Kernels of unpopped popcorn from the corn supply 140 are sucked through line 110 into chamber 105. Also, the vacuum in chamber 140 causes the outlet 135 to close to retain the corn therein. Also, salt is dispensed from salt supply 142 through tube 144 into kettle 156 when the vacuum is operated. A sealed diaphragm solenoid valve 150, placed in line 125 below the salt supply 142, is actuated to open when vacuum is present in line 115, thus allowing salt to be dispensed from the supply container 142 directly into the receptacle 156.

The amounts of salt and corn to be dispensed should be proportional. Table 1 illustrates the approximate relative amounts of corn, oil and salt to be used depending upon the size of the kettle.

TABLE I

| Type | Corn (ounces) | Oil (ounces) | Salt (grams) |
|---|---|---|---|
| I | 44 | 15 | 60 |
| II | 32 | 11 | 45 |
| III | 20 | 7 | 30 |
| IV | 16 | 5 | 23 |
| V | 14 | 4 | 15 |

If desired sugar may be used instead of or along with salt. A second salt dispensing apparatus can be used to dispense sugar. The relative amounts are approximately the same as those disclosed for salt.

FIG. 4 illustrates the position of the corn chamber outlet 135 and salt supply outlet 144 with respect to the receptacle 156 of the kettle. As noted above, salt is dispensed into the receptacle 156 while the vacuum is present in lines 110, 115 and 125 while chamber 105 is filling with corn. FIGS. 3 and 4 shows the chamber 105 filled with corn just prior to termination of the vacuum. When the vacuum is stopped, the weight of the corn in the chamber 105 causes the outlet 135 to pivot about hinge 138 thus dropping the corn directly into into the receptacle 156 where salt and oil are already present. Container 105 is provided with sloped bottom walls 108 to facilitate exit of the corn through the outlet 135. The corn popping cycle then begins. It should be noted that the receptacle 156 includes a mixer therein so that the salt, corn and oil are continuously intermingled during the popping cycle.

The preferred sequence for operation of the automated popcorn popping apparatus of the invention is described as follows. Initially, the unit is energized to initiate heating of the receptacle 156 to the appropriate popping temperature. The kettle utilizes a thermostat to determine the appropriate temperature, which for the preferred embodiment of popping corn in coconut oil is 475° F. One skilled in the art can determine the appropriate temperatures when other oils or oil mixtures are used. Once the appropriate temperature is achieved, the oil is directed from its supply into receptacle 156 at the amount given above for the size unit being used. After the oil is dispensed, corn and salt are delivered to the receptacle 156 according to the operation of the dispensing device 100 described above. This takes approximately 4–6 seconds. Thereafter, a popping cycle of approximately 4½ minutes is needed to pop substantially all the corn in the receptacle. After the popping cycle, discharge of the receptacle is achieved by operation of the motor in the manner described herein. This takes only a few seconds so that the entire operation takes approximately six minutes. While this sequence is preferred, other orders of addition of the ingredients can be used.

Figure 7:
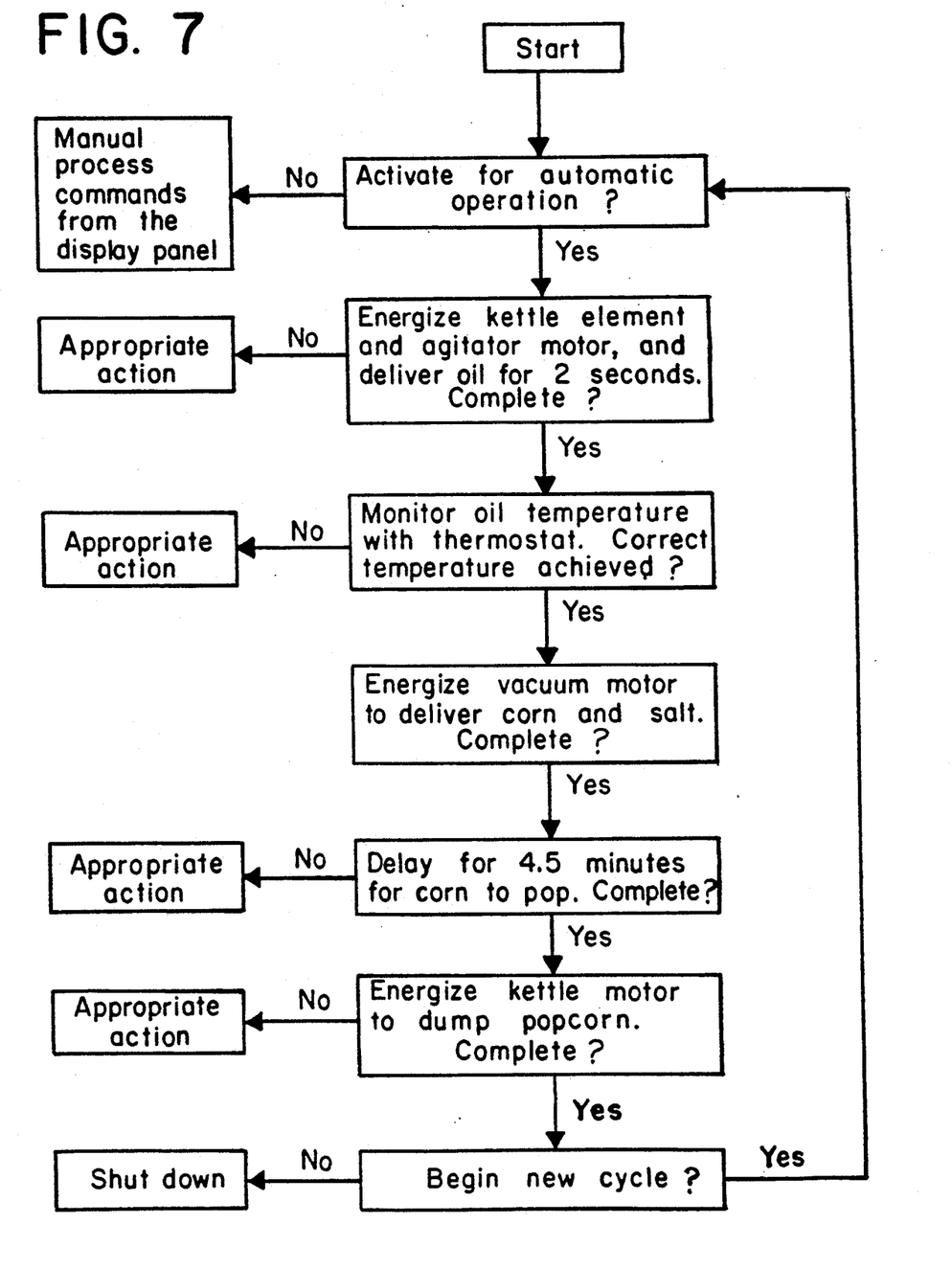
FIG. 7 is a schematic of a logic diagram for a digital programmer which may be used to sequentially energize the various means of the apparatus.

One way of achieving the appropriate timing of the various components of the apparatus is by the use of a cammed switching arrangement. A cam motor operating at approximately 6 rpm with the appropriately sized cams and switches can easily achieve the operation described above. Also, a digital programmer could be used instead to achieve the same results, with the previously described sequence of events illustrated in the logic diagram of FIG. 7.

Figures 5, 6:
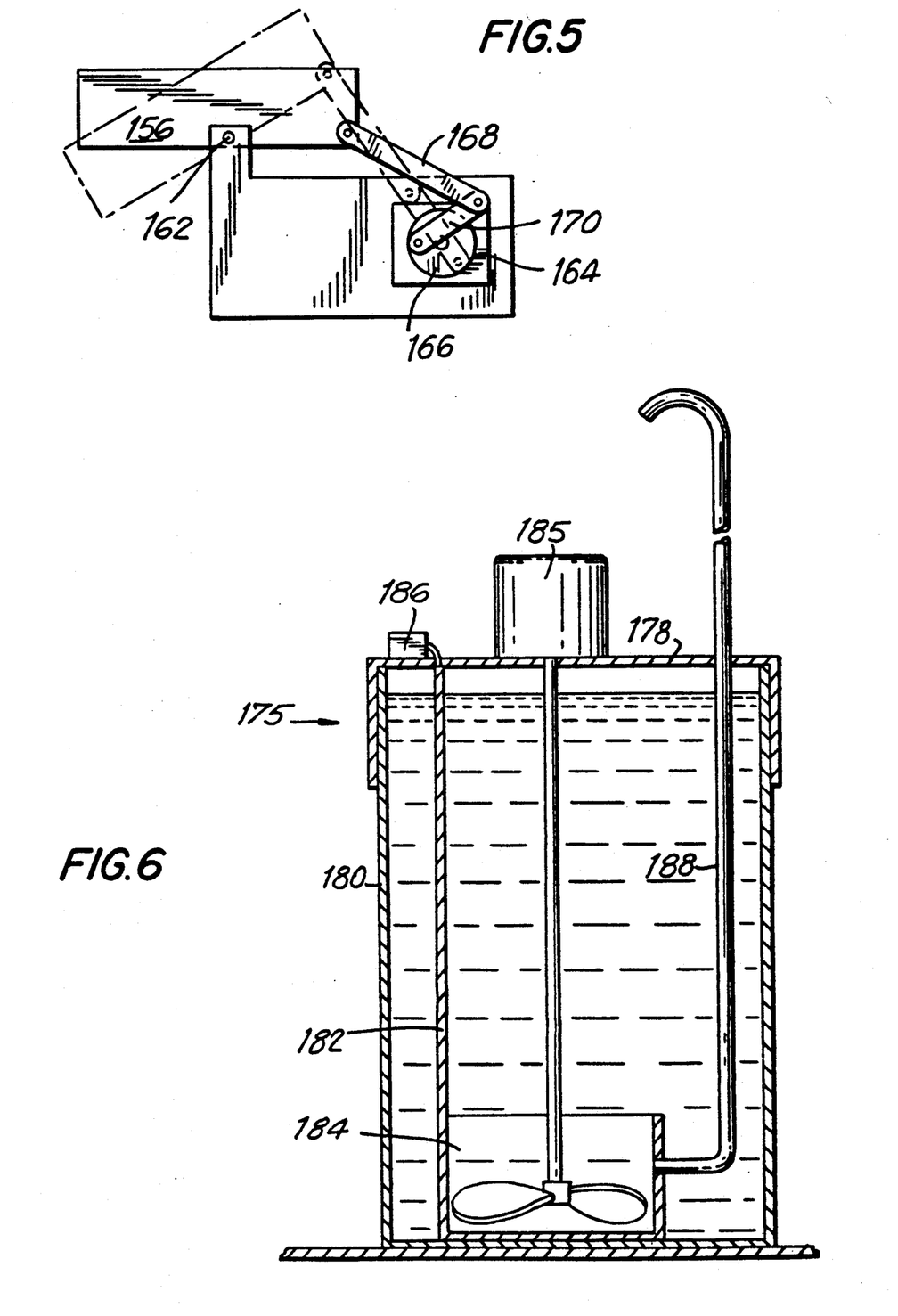
FIG. 5 is an alternate embodiment of the popped corn dispensing means of the invention.
FIG. 6 is a side view of an oil heating and dispensing pump for use with the apparatus of the invention.

FIG. 5 illustrates a preferred embodiment for the receptacle discharge motor and arm member. In this embodiment, receptacle 156 includes a central pivot point 162 for tilting between an upright position, when the corn is popping, to an inclined position, shown in phantom, for discharge of the popped corn. Movement of the receptacle between these positions is achieved by operation of an electric gear motor 164. This motor 164 rotates wheel 166 one revolution in either a clockwise or counterclockwise direction. Receptacle 156 is connected to wheel 166 through arm members 168, 170. One end of member 168 is pivotably attached to receptacle 156 and the other end is pivotably attached to member 170, while the opposite end of member 170 is eccentrically and pivotably mounted on wheel 164.

As noted above, one revolution of wheel 166 in either the clockwise or counterclockwise direction causes the receptacle to empty its contents. Since the motor 164 only has to operate in one direction, this arrangement is preferred compared to that of FIG. 1, which requires a reversible direction motor. Discharge of receptacle is achieved by operating motor 164 after completion of the popping cycle.

Referring now to FIG. 6, there is illustrated a preferred oil pump and heating apparatus for use in this invention. This apparatus is configured in the form of a lid 178 for placement onto a standard size seven gallon drum 180 of the preferred popping oil, coconut oil. Since coconut oil is a solid at temperatures below approximately 79° F., a heating element 182 is used to maintain the temperature of the oil at 80° F. or above so that it would be conveniently retained as a liquid for dispensing into receptacle 156. The lid 178 also supports the motor 185 which drives pump 184. The heating element 182 also functions as a supporting wall for the submersible pump 184, and is connected to a low-voltage thermostat 186 for continuous operation to maintain the oil at the desired temperature. The output of the submersible pump 184 is a tube 188 which extends through lid 178 to the receptacle 156 for dispensing oil therein. If desired to facilitate servicing, tube 188 can include fittings or other connections instead of a continuous line. Specific pumps which can be incorporated into the lid as described above are available from C. Cretors & Co., as model nos. 7700 or 7700 SC automatic push button oil pump and by Gold Medal as their bucket seasoning pump model no. 2114. It is advantageous to modify this pump to be operated at a line voltage of 24 volts as described above. This is easily done by removing the timer which is supplied with this standard pump and by including the appropriate electronic components therein. After the container 180 all that has to be done to continue further operation is to remove the lid assembly 178 from atop the spent container 180 and reposition it onto a new container. Since this oil is usually a solid, it is necessary to liquify it in order to insert the pump 184 and heating element 182 therein. Such liquifying of the oil can be achieved by a heat bar, or by retaining the container in as heated enclosure. An additional advantage of the present invention is that, once the pump and heating apparatus 175 is inserted into the container 180, the heating element 182 can be continuously operated at low voltage so as to maintain the oil at the appropriate dispensing temperature. Instead of continuously operating the heating element 182, a timer can be included for presetting the time that the unit is energized. Thus, it would be possible to turn on the element 182 sufficiently in advance of the time that the popping unit is to be used so that oil will be liquid when needed. Generally, about two hours are needed to heat the oil in the container from solid to liquid.

While it is apparent that the invention herein disclosed is well calculated to fulfill the objects above stated, it will be appreciated that numerous modifications and embodiments may be devised by those skilled in the art. For example, other corn delivery systems can be used, such as that disclosed in U.S. Pat. No. 3,645,422 or by a conveyor belt or bucket system. Also, the sequence of introduction of the oil, corn, salt and/or sugar can be varied depending upon the desires of the user. While such systems are not preferred, it is intended that the appended claims cover all such modifications and embodiments as fall within the true spirit and scope of the present invention.

What is claimed is:

1. An automated corn popping apparatus comprising:
   kettle means for heating oil and popping corn therein;
   means for delivering oil to said kettle means;
   means for delivering uniform predetermined amounts of corn and salt to said kettle means;
   means for emptying the contents of said kettle means at predetermined intervals; and
   means for energizing each of the preceding means according to a predetermined sequence so that the kettle means is heated prior to the introduction of oil, corn and salt therein, and is emptied after substantially all of the corn has popped.

2. The apparatus of claim 1 wherein said corn delivery means includes a chamber located above said kettle, means for periodically removing said predetermined amount of corn from a supply prior to delivering said amount to said kettle means.

3. The apparatus of claim 2 wherein said chamber comprises a container having a feed line connected to said corn supply, and sloped bottom walls extending to outlet means; and a vacuum line connected to vacuum generating means.

4. The apparatus of claim 3 wherein said outlet means comprises a hinged closure member located on a bottom portion of said chamber, said closure member being retained in a closed position when said chamber is under vacuum, and movable to an open position by the weight of the corn in said chamber when the vacuum is terminated and wherein said vacuum generating means includes a vacuum motor.

5. The apparatus of claim 3 wherein said salt delivery means includes a hopper for retaining a supply of salt therein, and valve means connected to said vacuum line, said valve means normally being maintained in a closed position, but capable opening when vacuum is present in said vacuum line to deliver a predetermined amount of salt to said kettle means.

6. The apparatus of claim 5 wherein the amount of salt to be delivered to said kettle means proportionally corresponds to the amount of corn to be delivered.

7. The apparatus of claim 1 wherein said oil delivery means includes an oil supply tank; means for heating said oil to a predetermined temperature; means for maintaining said predetermined temperature of said oil; and pumping means for delivery of said heated oil to said kettle means.

8. The apparatus of claim 7 wherein said pumping means includes a submersible pump located adjacent the bottom of said oil supply tank and conduit means extending from said pump to said kettle means.

9. The apparatus of claim 7 wherein said oil temperature maintaining means includes a 24 volt heating element.

10. The apparatus of claim 1 wherein said energizing means comprises a digital programmer timer.

11. The apparatus of claim 10 wherein said kettle means further comprises a thermostat operatively associated with said digital programmer so that said digital programmer is not operated until said thermostat senses that said kettle means has achieved an appropriate corn popping temperature.

12. The apparatus of claim 1 wherein said emptying means includes motor means connected to said kettle means by at least one elongated arm member, whereby operation of said motor causes said kettle means to pivot from an upright position to an inclined position so that said contents are emptied prior to returning said kettle means to said upright position.

13. An automated popcorn popping and warming apparatus comprising:
   the automated popcorn popping apparatus of claim 1;
   a bin including a first portion for supporting said popping apparatus and a second portion for holding popped corn; and
   a base for supporting said bin and including means for supplying heated air to said second bin portion to keep said popped corn warm.

14. The apparatus of claim 13 further comprising a popcorn warming chamber located adjacent said second bin portion and including a chute member in a wall between said warming chamber and second bin portion.

15. The apparatus of claim 14 wherein said popcorn warming chamber comprises:
   first storage means for holding an amount of bulk food at a predetermined temperature above room temperature;
   second storage means located above said first storage means for holding a plurality of individualized food portions;
   means for heating air for said first storage means for warming said bulk food to said predetermined temperature;
   means for connecting said first and second storage means to enable heated air in said first storage means to pass into said second storage means; and means for returning heated air from said second storage means to said first means.

16. The apparatus of claim 15 wherein said connecting means comprises a common wall located between said first and second storage means and having a plurality of apertures therein, and said second storage means includes means for supporting said individualized food portions, said support means including means for enabling heated air to pass therethrough or therearound.

17. The apparatus of claim 15 wherein the heat returning means comprises at least one conduit connecting said first and second storage means; and wherein said conduit includes blower means for circulating said air from said second storage means to said first storage means.

18. The apparatus of claim 15 wherein the heat returning means comprises at least one conduit connecting said first and second storage means, and wherein said means for heating air comprises an electric heater located on a wall within said first storage means.

19. The apparatus of claim 15 wherein said first and second storage means each includes separate means for access thereto, said access means of said second storage means being at least partially transparent for viewing said individualized food portions therein.

20. The apparatus of claim 19 wherein said first and second storage means are connected by a common wall having a plurality of apertures therein, the apertures in a portion of said common wall being sufficiently large to allow unpopped corn to pass therethrough and further comprising a drawer in said second compartment beneath said common wall portion for retaining unpopped corn for removal from said apparatus.

21. An automated popcorn popping and warming apparatus comprising:
a first storage compartment for holding an amount of popped corn;
means for heating said first storage compartment to a predetermined temperature for warming said popped corn;
popcorn popping means;
a second storage compartment for supporting said first compartment and housing electrical components;
corn supply means;
salt supply means;
popping oil supply means;
means for directing a predetermined amount of said corn, salt and oil to said popping means; and
means for dispensing popped corn from said popping means to said first storage compartment.

22. The apparatus of claim 21 wherein said corn supply means and oil supply means are located within said second storage compartment.

23. The apparatus of claim 21 wherein said oil supply means is a sealed container comprising pumping means and conduit means for directing said oil to said popcorn popping means.

24. The apparatus of claim 21 wherein said means for directing predetermined amounts of said corn to said popcorn popping means comprises a chamber, conduit means extending from said corn supply means to said chamber and means for withdrawing a predetermined amount of said corn from said corn supply means to said chamber, said chamber located above said popcorn popping means and including means for dispensing said predetermined amount of corn thereinto.

25. The apparatus of claim 24 wherein said dispensing means comprises a hinged closure member located on a bottom portion of said chamber, said closure member being retained in a closed position when said chamber is under vacuum, and movable to an open position by the weight of the corn in said chamber when the vacuum is terminated.

26. The apparatus of claim 24 wherein said salt delivery means includes a hopper for retaining a supply of salt therein, and valve means connected to a vacuum line, said valve means normally being maintained in a closed position, but opening when vacuum is present in said vacuum line to deliver a predetermined amount of salt to said popcorn popping means.

27. The apparatus of claim 21 wherein said popcorn popping means comprises receptacle means for receiving said corn and means for heating said corn to an appropriate popping temperature, said receptacle means being made from a conductive material, said heating means comprising heating coils adjacent said receptacle.

28. The apparatus of claim 21 wherein said popcorn dispensing means includes a motor and said receptacle means is pivotably mounted within said first storage compartment with said motor connected to said receptacle means through at least one elongated arm member such that operation of said motor pivots said receptacle means from an upright position to an inclined position whereby said popped corn is dispensed from said receptacle to said first storage compartment.

29. The apparatus of claim 21 wherein said first storage compartment comprises a chute for delivering popped corn to an adjacent popcorn warming chamber.

30. The apparatus of claim 21 wherein said first storage compartment heating means comprises an electric, heating coil and means for directing heated air into said first storage compartment.

31. The apparatus of claim 21 wherein said popcorn warming chamber comprises:
first storage means for holding an amount of bulk food at a predetermined temperature above room temperature;
second storage means located above said first storage means for holding a plurality of individualized food portions;
means for heating air for said first storage means for warming said bulk food to said predetermined temperature;
means for connecting said first and second storage means to enable heated air in said first storage means to pass into said second storage means; and
means for returning heated air from said second storage means to said first means.

32. The apparatus of claim 31 wherein said connecting means comprises a common wall located between said first and second storage means and having a plurality of apertures therein, and said second storage means includes means for supporting said individualized food portions, said support means including means for enabling heated air to pass therethrough or therearound.

33. The apparatus of claim 31 wherein the heat returning means comprises at least one conduit connecting said first and second storage means; and wherein said conduit includes blower means for circulating said air from said second storage means to said first storage means.

34. The apparatus of claim 31 wherein the heat returning means comprises at least one conduit connecting said first and second storage means, and wherein said means for heating air comprises an electric heater located on a wall within said first storage means.

35. The apparatus of claim 21 wherein said first and second storage means each includes separate means for access thereinto, said access means of said second storage means being at least partially transparent for viewing said individualized food portions therein.

36. The apparatus of claim 35 wherein said first and second storage means are connected by a common wall having a plurality of apertures therein, the apertures in a portion of said common wall being sufficiently large to allow unpopped corn to pass therethrough and further comprising a drawer in said second compartment beneath said common wall portion for retaining of unpopped corn for removal from said apparatus.

* * * * *